US008600935B1

(12) United States Patent
Dantkale et al.

(10) Patent No.: US 8,600,935 B1
(45) Date of Patent: Dec. 3, 2013

(54) SYSTEMS AND METHODS FOR ACHIEVING FILE-LEVEL DATA-PROTECTION OPERATIONS USING BLOCK-LEVEL TECHNOLOGIES

(75) Inventors: Suhas Dantkale, Solapur (IN); Niranjan Pendharkar, Pune (IN)

(73) Assignee: Symantec Corporation, Mountain View, CA (US)

( * ) Notice: Subject to any disclaimer, the term of this patent is extended or adjusted under 35 U.S.C. 154(b) by 529 days.

(21) Appl. No.: 12/716,669

(22) Filed: Mar. 3, 2010

(51) Int. Cl.
*G06F 7/00* (2006.01)
*G06F 17/00* (2006.01)

(52) U.S. Cl.
USPC ........... 707/624; 707/646; 707/653; 707/694; 707/781

(58) Field of Classification Search
USPC ......... 707/609, 610, 624, 625, 640, 644, 646, 707/653, 687, 694, 705, 781
See application file for complete search history.

(56) References Cited

U.S. PATENT DOCUMENTS

| | | | | |
|---|---|---|---|---|
| 5,819,020 A * | 10/1998 | Beeler, Jr. | ..................... | 714/5.11 |
| 6,631,480 B2 * | 10/2003 | Zeigler et al. | ................... | 714/20 |
| 6,757,698 B2 * | 6/2004 | McBride et al. | ............... | 707/204 |
| 6,971,018 B1 * | 11/2005 | Witt et al. | ...................... | 713/187 |
| 7,165,059 B1 * | 1/2007 | Shah et al. | ........................ | 707/1 |
| 7,506,213 B1 * | 3/2009 | Cabrera et al. | .................. | 714/42 |
| 8,005,797 B1 * | 8/2011 | Chepel et al. | .................. | 707/649 |
| 8,055,613 B1 * | 11/2011 | Mu et al. | ........................ | 707/610 |
| 2005/0138089 A1 | 6/2005 | Kasai | | |
| 2006/0075004 A1 | 4/2006 | Stakutis et al. | | |
| 2007/0106851 A1 | 5/2007 | Bonwick et al. | | |
| 2008/0250215 A1 | 10/2008 | Shitomi | | |
| 2009/0006495 A1 * | 1/2009 | Ramasubramanian et al. | ............................. | 707/203 |
| 2010/0100527 A1 * | 4/2010 | Gwozdz et al. | ............... | 707/610 |

* cited by examiner

*Primary Examiner* — Marc Somers
(74) *Attorney, Agent, or Firm* — ALG Intellectual Property LLC

(57) ABSTRACT

A computer-implemented method for achieving file-level data-protection operations using block-level technologies may include: 1) identifying an I/O operation directed to at least one data block on a primary storage system, 2) accessing a data-protection list that uniquely identifies files that are to be protected by a data-protection operation, 3) determining that the I/O operation is directed to at least a portion of at least one file identified on the data-protection list, and then, in response to the determination, 4) performing the data-protection operation on the I/O operation. Various additional methods, systems, and configured computer-readable media are also disclosed.

18 Claims, 9 Drawing Sheets

Data-Protection List
122

```
------------------------------------------------------------------------
****************************************************
File:  doc.txt
Inode:  781956
****************************************************
File:  app.cfg
Inode:  781964
****************************************************
File:  tune.mp3
Inode:  781497
****************************************************
File:  word.doc
Inode:  781354
****************************************************
File:  ssheet.xls
Inode:  781987
****************************************************
File:  data.tmp
Inode:  781376
****************************************************
File:  finances.qbw
Inode:  781973
****************************************************
File:  db.xml
Inode:  781267
****************************************************
File:  email.html
Inode:  781489
****************************************************
```

*FIG. 6*

SYSTEMS AND METHODS FOR ACHIEVING FILE-LEVEL DATA-PROTECTION OPERATIONS USING BLOCK-LEVEL TECHNOLOGIES

BACKGROUND

Data-protection technologies (such as data-replication, continuous-data-protection, snapshot, and/or backup technologies) may enable organizations to protect and/or improve the reliability, fault-tolerance, and/or accessibility of their applications and/or data. For example, an organization may replicate, mirror, or otherwise copy data (or input/output ("I/O") operations directed to such data) from a primary site or device (such as an application server) to a secondary (i.e., backup) site or device for data-protection purposes.

Data-protection technologies typically protect data either at the file level or at the block level. For example, a data-level replication agent may replicate data in a volume on a block-by-block basis. While block-level data-protection technologies may offer various performance advantages over file-level technologies (since, e.g., block-level technologies do not need to access files via, and/or receive permissions from, a file system), block-level technologies are typically unable to protect data on a file-by-file basis. For example, a user may unable to instruct a block-level replication agent to only replicate writes that are directed to a select set of files within a file system since the replication agent may lack access to or knowledge of the file system and its structure. Similarly, a user may unable to instruct a block-level copy-on-write snapshot agent to only add writes that are directed to a select set of files within a file system to a snapshot since the snapshot agent may lack access to or knowledge of the file system and its structure.

As such, the instant disclosure identifies a need for achieving file-level data-protection operations while maintaining the performance advantages offered by data-level technologies.

SUMMARY

As will be described in greater detail below, the instant disclosure generally relates to systems and methods for achieving file-level data-protection operations using block-level technologies. In one example, the systems described herein may accomplish such a task by: 1) identifying an I/O operation directed to at least one data block on a primary storage system, 2) accessing a data-protection list that uniquely identifies files that are to be protected by a data-protection operation (such as a data-replication, continuous-data-protection, and/or snapshot or backup operation), 3) determining that the I/O operation is directed to at least a portion of at least one file identified on the data-protection list, and then, in response to the determination, 4) performing the data-protection operation on the I/O operation (by, e.g., replicating, mirroring, or otherwise copying the I/O operation to a secondary storage system).

The systems described herein may perform the above-described method in a variety of ways and in a variety of contexts. In one example, a module positioned at the file-system level may maintain the data-protection list. In this example, the module may, upon receiving a request from an application to perform an I/O operation on a file, determine whether the file in question: 1) represents file-system metadata and/or 2) is identified on the data-protection list. If so, then the module may flag an I/O descriptor for the I/O operation prior to sending the same to an underlying volume manager and/or storage system. In one example, this flag may instruct a data-protection agent at the volume-manager and/or storage-system level to perform a data-protection operation on the I/O operation identified within the flagged I/O descriptor.

In another example, a module positioned at the volume-manager and/or storage-device level may maintain the data-protection list. In this example, a module positioned at the file-system level may: 1) identify and assign a unique file identifier (such as an inode number and/or file handle) to each I/O descriptor that it sends to an underlying volume manager and/or storage system (e.g., upon receiving a request from an application to perform an I/O operation on a file, the module positioned at the file-system level may, when generating an I/O descriptor for the requested I/O operation, include an inode number or other file descriptor for the file in question within the I/O descriptor) and/or 2) indicate whether the I/O operation identified within each I/O descriptor that it sends to an underlying volume manager and/or storage system is directed to file-system metadata (by, e.g., flagging the I/O descriptor as file-system metadata). Upon receiving an I/O descriptor from the file system, a module at the volume-manager level and/or storage-system level may determine whether: 1) the unique file identifier associated with the I/O descriptor is contained within the data-protection list and/or 2) the I/O descriptor has been flagged as file-system metadata. If so, then a data-protection agent at the volume-manager and/or storage-system level may perform a data-protection operation on the I/O operation identified within the I/O descriptor.

The data-protection list may represent an inclusion and/or an exclusion list. For example, the data-protection list may uniquely identify files that are to be protected when performing a data-protection operation by: 1) uniquely identifying files that are to be included when performing the data-protection operation and/or 2) uniquely identifying files that are to be excluded when performing the data-protection operation. In some examples, the data-protection list may uniquely identify user-specified and/or machine-specified files (such as files generated or accessed by a specific application, files associated with a specific user, or the like) that are to be protected by the data-protection operation. In one example, a filter driver at the secondary storage system may filter out all requests to access files on the secondary storage system that are not identified on the data-protection list (by, e.g., only servicing I/O requests that are directed to files that are identified within the data-protection list) in order to maintain file-system consistency.

As will be explained in greater detail below, by maintaining a data-protection list that uniquely identifies user- or machine-specified files that are to be protected by a data-protection operation, the systems and methods described herein may enable users to selectively protect files (or I/O operations directed to such files) using traditional block-level technologies. As such, these systems and methods may enable users to protect data at the file level while maintaining the performance advantages offered by data-level technologies.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification.

FIG. 6 is a block diagram of an exemplary data-protection list that uniquely identifies files that are to be protected by a data-protection operation.

Figure 1:
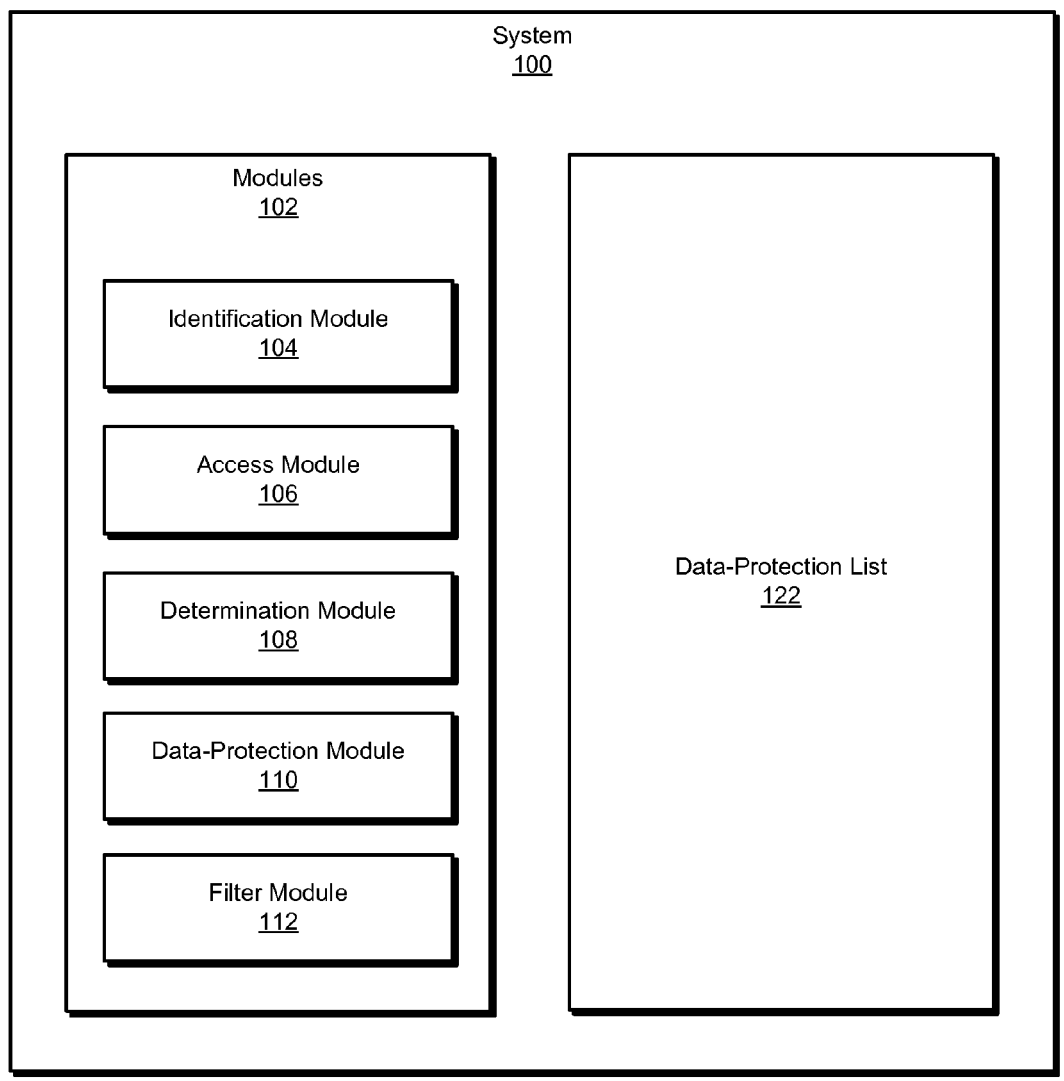
FIG. 1 is a block diagram of an exemplary system for achieving file-level data-protection operations using block-level technologies.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

As will be described in greater detail below, the instant disclosure generally relates to systems and methods for achieving file-level data-protection operations using block-level technologies. The phrase "data-protection operation," as used herein, may refer to any type or form of operation for protecting data and/or I/O operations directed to such data. Examples of data-protection operations include, without limitation, data-replication operations, continuous-data-protection operations, data-mirroring operations, snapshot operations (such as a copy-on-right (space-optimized or non-space-optimized) or mirror-break-off snapshots), backup operations (such as full, incremental, or snapshot-based backups), or the like.

The following will provide, with reference to FIGS. 1-4 and 6-7, detailed descriptions of exemplary systems for achieving file-level data-protection operations using block-level technologies. Detailed descriptions of corresponding computer-implemented methods will also be provided in connection with FIG. 5. In addition, detailed descriptions of an exemplary computing system and network architecture capable of implementing one or more of the embodiments described herein will be provided in connection with FIGS. 8 and 9, respectively.

FIG. 1 is a block diagram of an exemplary system 100 for achieving file-level data-protection operations using block-level technologies. As illustrated in this figure, exemplary system 100 may include one or more modules 102 for performing one or more tasks. For example, and as will be explained in greater detail below, exemplary system 100 may include an identification module 104 programmed to identify an I/O operation directed to at least one data block on a primary storage system. Exemplary system 100 may also include an access module 106 programmed to access a data-protection list that uniquely identifies files that are to be protected by a data-protection operation.

In addition, and as will be described in greater detail below, exemplary system 100 may include a determination module 108 programmed to determine whether an identified I/O operation is directed to at least a portion of at least one file identified on the data-protection list. Exemplary system 100 may also include a data-protection module 110 programmed to perform data-protection operations on I/O operations that are directed to files identified on the data-protection list (by, e.g., replicating, mirroring, or otherwise copying the I/O operations to a secondary storage system). In addition, exemplary system 100 may include a filter module 112 programmed to filter out all requests to access files on the secondary storage system that are not identified on the data-protection list. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, as will be described in greater detail below, one or more of modules 102 may represent software modules stored and configured to run on one or more computing devices, such as the devices illustrated in FIGS. 2-4 (e.g., primary sites 202, 302, and 402 and/or secondary sites 222, 322, and 422), computing system 810 in FIG. 8, and/or portions of exemplary network architecture 900 in FIG. 9. One or more of modules 102 in FIG. 1 may also represent all or portions of one or more special-purpose computers configured to perform one or more tasks.

As illustrated in FIG. 1, exemplary system 100 may also include a data-protection list 122. As will be explained in greater detail below, data-protection list 122 may uniquely identify files that are to be protected by a data-protection operation. In some examples, data-protection list 122 may be stored on one or more of the devices illustrated in FIGS. 2-4 (e.g., primary sites 202, 302, and 402 and/or secondary sites 222, 322, and 422), computing system 810 in FIG. 8, and/or portions of exemplary network architecture 900 in FIG. 9.

Figure 2:
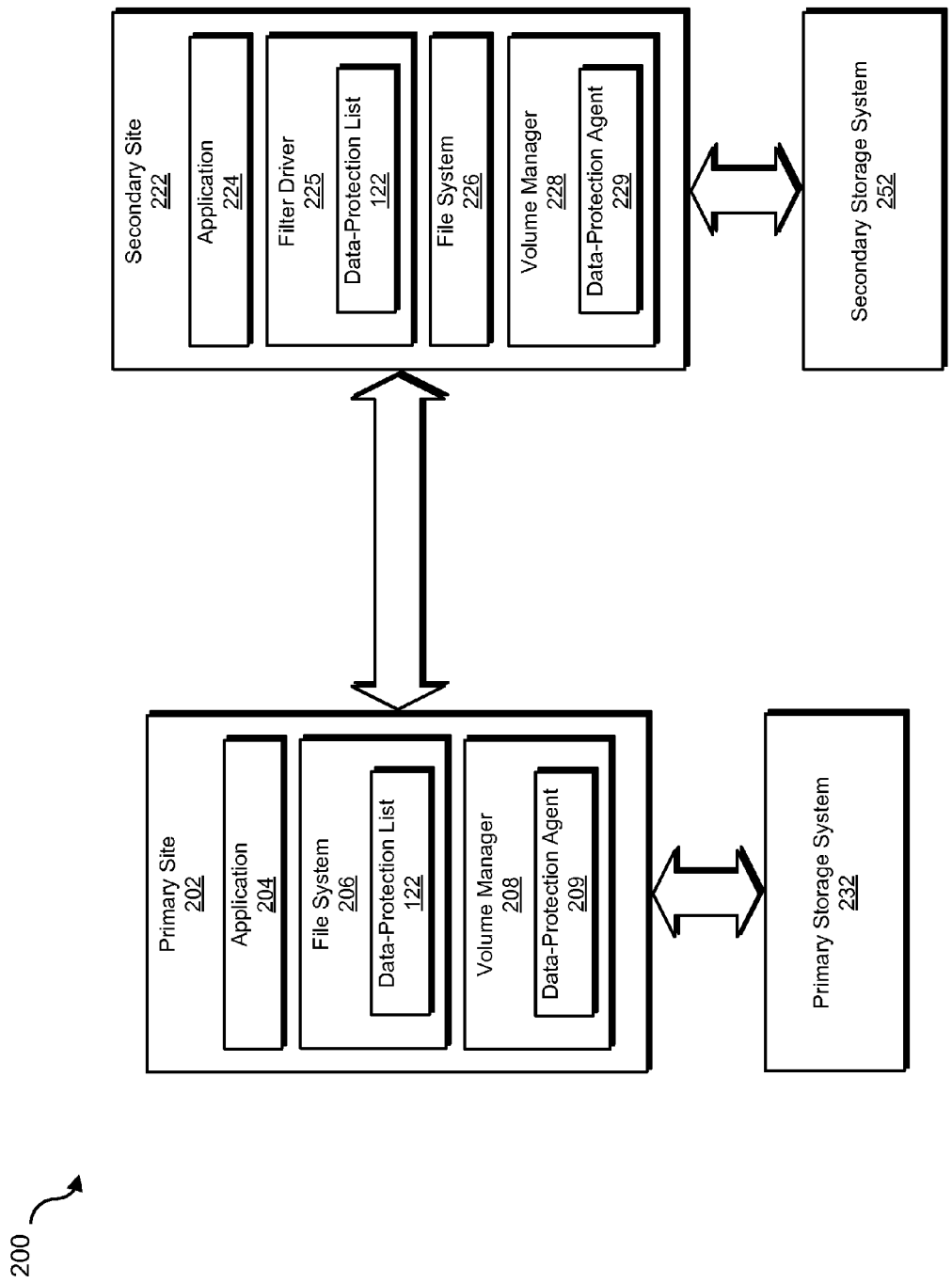
FIG. 2 is a block diagram of an exemplary system for achieving file-level data-protection operations using block-level technologies.

Exemplary system 100 in FIG. 1 may be deployed in a variety of ways. For example, all or a portion of exemplary system 100 may represent portions of exemplary system 200 in FIG. 2. As shown in FIG. 2, system 200 may include a primary site 202 in communication with a secondary site 222. In one embodiment, and as will be described in greater detail below, modules 102 from FIG. 1 may cause primary site 202 to: 1) identify an I/O operation directed to at least one data block on primary storage system 232, 2) access a data-protection list (e.g., data-protection list 122) that uniquely identifies files that are to be protected by a data-protection operation (such as a data-replication, continuous-data-protection, and/or snapshot or backup operation), 3) determine that the I/O operation is directed to at least a portion of at least one file identified on data-protection list 122, and then, in response to the determination, 4) perform the data-protection operation on the I/O operation (by, e.g., replicating, mirroring, or otherwise copying the I/O operation to secondary storage system 252 at secondary site 222).

Primary site 202 generally represents any type or form of computing device capable of performing data-protection operations, such as data-replication, data-mirroring, continuous-data-protection, snapshot, and/or backup operations. Examples of primary site 202 include, without limitation, application servers and database servers configured to provide various database services and/or run certain software applications, exemplary computing system 810 in FIG. 8, or any other suitable computing device. Similarly, secondary site 222 generally represents any type or form of computing device capable of receiving and storing replicated data, mirrored data, and/or snapshots or backups.

As illustrated in FIG. 2, in some examples primary and secondary sites 202 and 222 may include applications 204 and 224 (or, in FIGS. 3 and 4, applications 304 and 324 and applications 404 and 424), respectively. Applications 204 and 224 generally represent any type or form of application capable of generating and/or managing data (such as, e.g., a database). In some examples, applications 204 and 224 may store data within a storage system (such as storage systems 232 and 252).

Primary and secondary sites 202 and 222 may also include file systems 206 and 226 (or, in FIGS. 3 and 4, file systems 306 and 326 and file systems 406 and 426), respectively. In some examples, file systems 206 and 226 may contain a plurality of volumes backed by storage on a storage system, such as storage systems 232 and 252. Primary site 202 and secondary site 222 may also include, respectively, volume managers 208 and 228 capable of allocating space on a storage device (such as storage systems 232 and 252) to a file system (such as file systems 206 and 226). Examples of volume managers 208 and 228 include, without limitation, VERITAS VOLUME MANAGER, HP LOGICAL VOLUME MANAGER, ZFS, SOLARIS VOLUME MANAGER, or the like.

Figure 3:
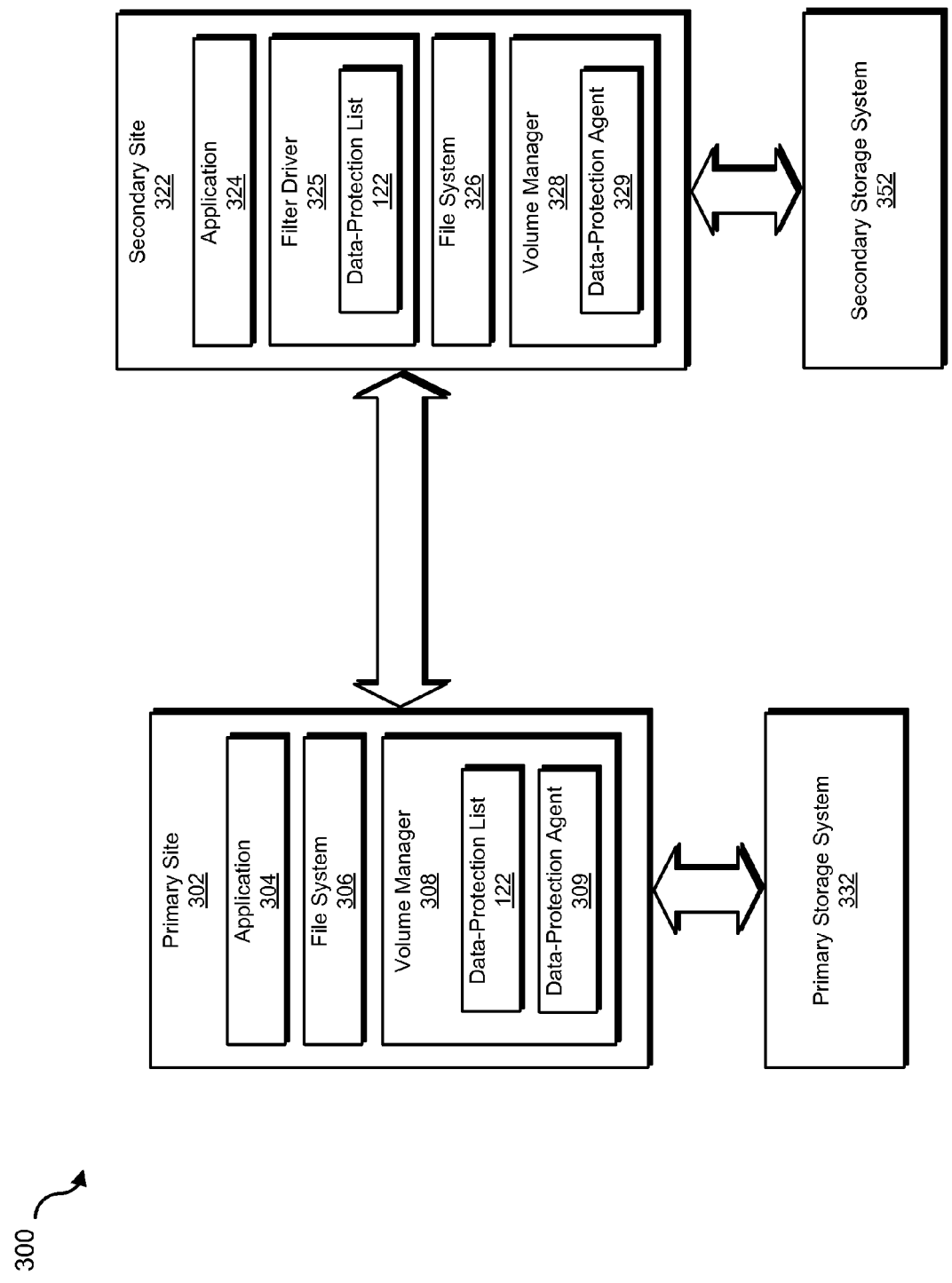
FIG. 3 is a block diagram of an additional exemplary system for achieving file-level data-protection operations using block-level technologies.
Figure 4:
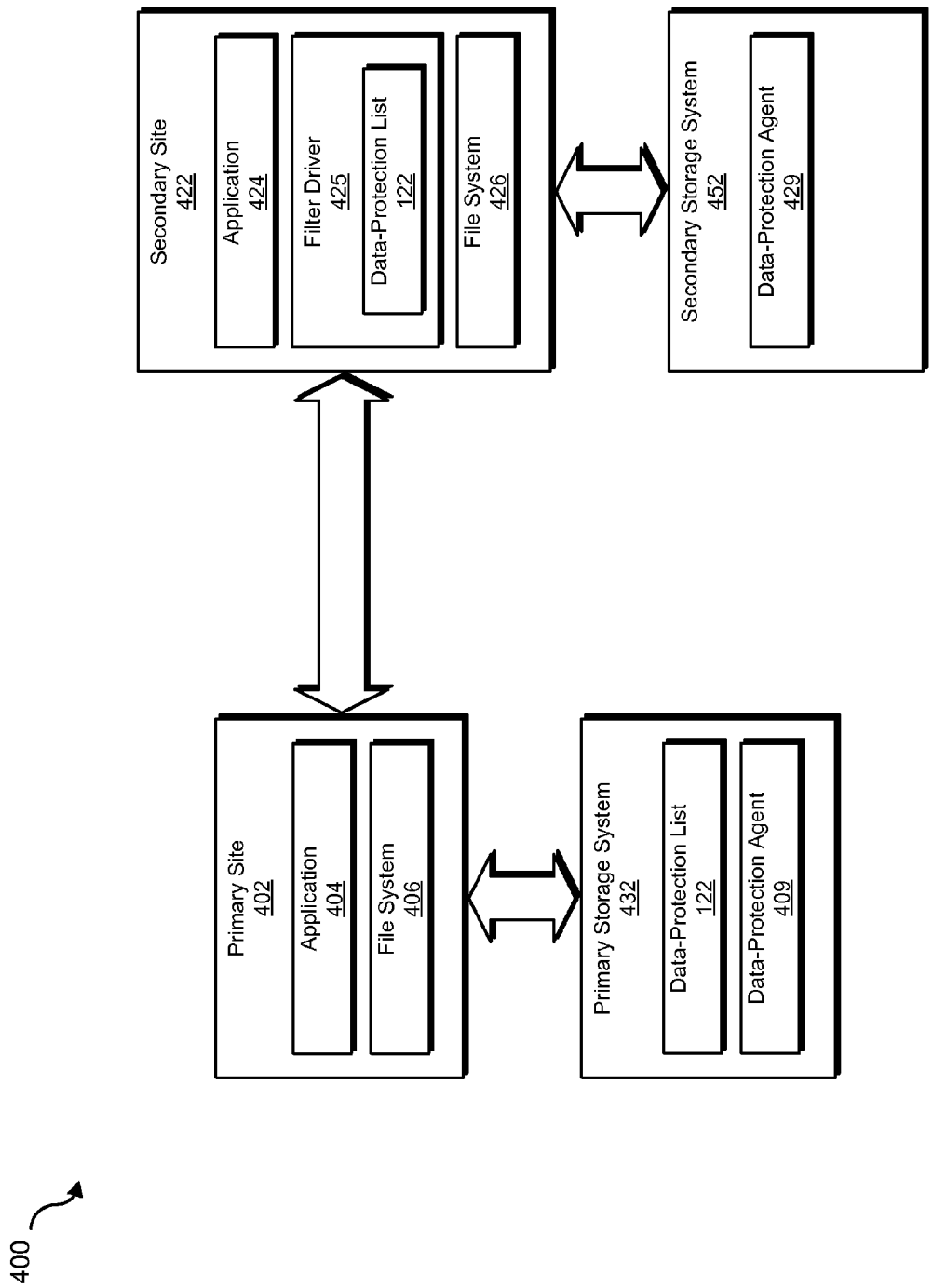
FIG. 4 is a block diagram of an additional exemplary system for achieving file-level data-protection operations using block-level technologies.

In some examples, primary site 202 may include a data-protection agent 209 (or, in FIGS. 3 and 4, data-protection agents 309 and 409). Data-protection agent 209 generally represents any type or form of agent or module capable of performing block-level data-protection operations on select I/O operations generated at primary site 202. Examples of data-protection agent 209 include, without limitation, block-level data-replication agents (such as VERITAS VOLUME REPLICATOR), block-level continuous-data-protection agents, block-level data-mirroring agents, block-level snapshot agents, block-level backup agents, or the like. Similarly, data-protection agent 229 on secondary site 222 (or, in FIGS. 3 and 4, data-protection agent 329 on secondary site 322 and data-protection agent 429 on secondary storage system 452) may represent any type or form of client-side agent or module capable of receiving protected data (such as replicated or mirrored data) from a primary site (such as primary site 202).

Data-protection agents 209 and 229 may represent host-based agents (located, for example, within a volume manager, such as volume managers 208, 228, 308, and 328 in FIGS. 2-3, on a host device) and/or disk-based agents (stored, for example, on a storage device, such as primary storage system 432 and/or secondary storage 452 in FIG. 4). As will be explained in greater detail below, in some examples application 204, file system 206, volume manager 208, and/or data-protection agents 209 and 229 may include one or more of modules 102 from FIG. 1.

Storage systems 232 and 252 generally represent any type or form of storage system or device (such as a disk array) capable of storing data for a computing system. In one example, storage system 232 and 252 may represent a thin-provisioned storage system capable of storing data on an as-needed and/or just-in-time basis. In some examples, storage systems 232 and 252 may provide storage for one or more applications or file systems of primary or secondary sites 202 and 222, respectively (e.g., applications 204 and 224 and/or file systems 206 and 226). In some examples, primary site 202 and/or secondary site 222 may interface with storage systems 232 and 252, respectively, via an API.

In some examples, primary site 202 and/or secondary site 222 may include data-protection list 122 from FIG. 1. As explained above, data-protection list 122 may uniquely identify files that are to be protected by a data-protection operation. As will be explained in greater detail below, data-protection list 122 may be maintained and/or located at the file-system level (by, e.g., file system 206 in FIG. 2), the volume-manager level (by, e.g., volume manager 308 in FIG. 3), and/or the storage-system level (by, e.g., primary and/or secondary storage systems 432 and 452 in FIG. 4).

Figure 5:
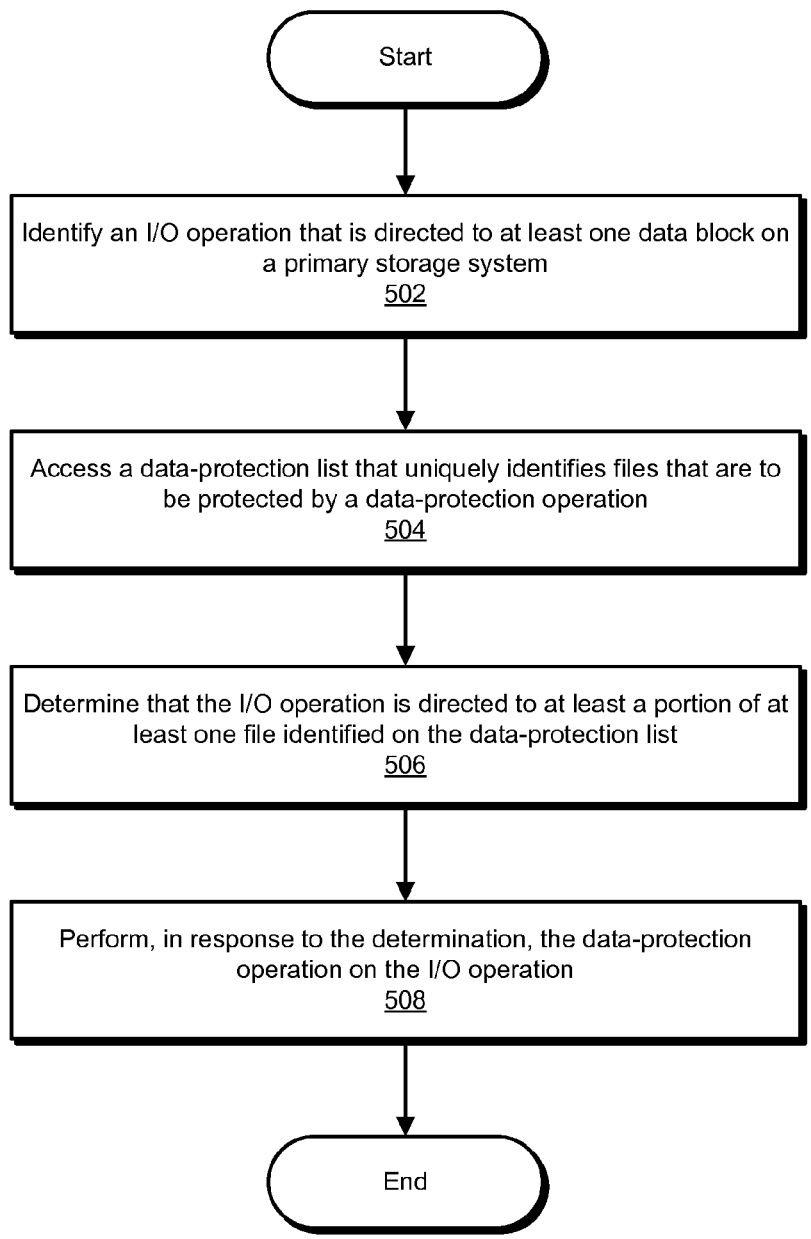
FIG. 5 is a flow diagram of an exemplary method for achieving file-level data-protection operations using block-level technologies.

FIG. 5 is a flow diagram of an exemplary computer-implemented method 500 for achieving file-level data-protection operations using block-level technologies. The steps shown in FIG. 5 may be performed by any suitable computer-executable code and/or computing system. In some embodiments, the steps shown in FIG. 5 may be performed by one or more of the components of system 100 in FIG. 1, system 200 in FIG. 2, system 300 in FIG. 3, system 400 in FIG. 4, computing system 810 in FIG. 8, and/or portions of exemplary network architecture 900 in FIG. 9.

As illustrated in FIG. 5, at step 502 one or more of the various systems described herein may identify an I/O operation directed to at least one data block on a primary storage system. For example, identification module 104 in FIG. 1 may, as part of file system 206 on primary site 202 in FIG. 2, receive a request from application 204 to perform an I/O operation on a file stored on primary storage system 232.

The systems described herein may identify an I/O operation in step 502 in a variety of ways and in a variety of contents. In one example, identification module 104 may identify an I/O operation as part of a file system. For example, identification module 104 may, as part of file system 206 in FIG. 2, receive a request from application 204 to perform an I/O operation on a file stored on primary source system 232. In this example, file system 206 may translate this request into an I/O request directed to the various data blocks that make up the file in question. For example, file system 206 may generate an I/O descriptor (such as I/O descriptors 702(A)-(B) in FIG. 7) that identifies, for example, the requested I/O operation type (e.g., read, write, delete, etc.), the storage device on which the data blocks that make up the file in question are located, and/or the locations within the storage device of the data blocks that make up the file in question. Upon generating this I/O descriptor, file system 206 may send the same to volume manager 208 and/or primary storage system 232.

The phrase "I/O descriptor," as used herein, may refer to any structure for identifying an I/O operation. Examples of I/O descriptors include, without limitation, I/O request packets, I/O buffer structures, or the like. In some examples, an I/O descriptor may contain information that identifies, among other items, an I/O operation type (e.g., read, write, delete, etc.), a storage device on which data blocks that are the target of the I/O operation are located, and/or the locations within the storage device of the data blocks that are the target of the I/O operation.

In another example, identification module 104 in FIG. 1 may identify an I/O operation as part of a volume manager and/or a storage system. For example, identification module 104 may, as part of data-protection agent 309 within volume manager 308 on primary site 302 in FIG. 3, receive an I/O descriptor from file system 306 that identifies an I/O operation directed to at least one data block on primary storage system 332. Similarly, identification module 104 may, as part of data-protection agent 409 on primary storage system 432 in FIG. 4, receive an I/O descriptor from file system 406 that identifies an I/O operation directed to at least one data block on primary storage system 432.

Returning to FIG. 5, at step 504 the systems described herein may access a data-protection list that uniquely identifies files that are to be protected by a data-protection operation. For example, access module 106 in FIG. 1 may, as part of file system 206 in FIG. 2, access a data-protection list 122 that uniquely identifies files that are to be protected by data-protection agent 209.

Data-protection list 122 may be stored within a variety of locations within a variety of devices. For example, and as illustrated in FIGS. 2-4, data-protection list 122 may be maintained by and/or located within a file system (such as file system 206 in FIG. 2), a volume manager (such as volume manager 308 in FIG. 3), and/or a storage system (such as primary storage system 432 in FIG. 4). As such, access module 106 in FIG. 1 may access or retrieve data-protection list 122 in step 504 as part of, for example: 1) a file system (such as file system 206 in FIG. 2), 2) a volume manager (such as volume manager 308 in FIG. 3), and/or 3) a storage system (such as primary storage system 432 in FIG. 4). In some examples, data-protection list 122 may also be maintained by and/or located within a filter driver (such as filter drivers 225, 325, and 425 in FIGS. 2-4) located at a secondary site (such as secondary sites 222, 322, and 422 in FIGS. 2-4), as will be described in greater detail below.

As detailed above, data-protection list 122 may uniquely identify files that are to be protected by a data-protection operation. The files identified within data-protection list 122 may be user-specified and/or machine-specified. For example, a user or administrator of primary site 202 may specify (via, e.g., a file system, volume manager, and/or data-protection agent) various files (such as files generated or accessed by a specific application, files associated with a specific user, or the like) that are to be protected by a data-protection operation. Additionally or alternatively, an application or agent on primary site 202 may specify (by interfacing with, e.g., a file system, volume manager, and/or data-protection agent) various files that are to be protected by a data-protection operation.

In some examples, a file system, volume manager, and/or data-protection agent may generate data-protection list 122 based at least in part on these user-specified and/or machine-specified files. Data-protection list 122 may also uniquely identify files in a variety of ways. For example, data-protection list 122 may uniquely identify a file using an inode number associated with the file, a file descriptor associated with the file (such as a file handle associated with the file within a WINDOWS environment), or the like. For example, data-protection list 122 in FIG. 6 may include an inode number for each file specified (by, e.g., a user and/or machine) as being subject to a data-protection operation.

Data-protection list 122 may represent an inclusion and/or an exclusion list. For example, data-protection list 122 may uniquely identify files that are to be protected when performing a data-protection operation by: 1) uniquely identifying files that are to be included when performing the data-protection operation and/or 2) uniquely identifying files that are to be excluded when performing the data-protection operation.

Returning to FIG. 5, at step 506 the systems described herein may determine that the I/O operation identified in step 502 is directed to at least a portion of at least one file identified on the data-protection list accessed in step 504. For example, determination module 108 in FIG. 1 may, as part of data-protection agent 209 within volume manager 208 on primary site 202 in FIG. 2, determine that an I/O operation identified within an I/O descriptor received from file system 206 is directed to at least a portion of at least one file identified within data-protection list 122.

The systems described herein may perform step 506 in a variety of ways and in a variety of contexts. For example, determination module 108 may perform step 506 at the file-system level (e.g., as part of file system 206 in FIG. 2), at the volume-manager level (e.g., as part of data-protection agent 309 within volume manager 308 in FIG. 3), and/or at the storage level (e.g., as part of primary storage system 432 in FIG. 4).

For example, in one embodiment a module positioned at the file-system level may maintain the data-protection list. In this example, the module may, upon receiving a request from an application to perform an I/O operation on a file, determine whether the file in question: 1) represents file-system metadata and/or 2) is identified on the data-protection list. If so, then the module may flag an I/O descriptor for the I/O operation prior to sending the same to an underlying volume manager and/or storage system. In one example, this flag may instruct a data-protection agent at the volume-manager and/or storage-system level to perform a data-protection operation on the I/O operation identified within the flagged I/O descriptor.

For example, identification module 104 in FIG. 1 may, as part of file system 206 in FIG. 2, receive a request from application 204 to perform a write on a file named "doc.txt" having an inode number of "781956." In this example, access module 106 and/or determination module 108 may then determine (as part of file system 206), by accessing and analyzing data-protection list 122, that the inode number ("781956") for the file in question is identified within data-protection list 122 in FIG. 6. File system 206 may then generate an I/O descriptor for the requested I/O operation and flag the same as being subject to a data-protection operation. For example, file system 206 may generate I/O descriptor 702(B) for the requested I/O operation and then flag the same as being subject to a data-protection operation (by, e.g., activating data-protection flag 708(B)). File system 206 may then send I/O descriptor 702(B) to volume manager 208.

Upon receiving I/O descriptor 702(B) from file system 206, data-protection agent 209 may, as part of volume manager 208 in FIG. 2, determine that I/O descriptor 702(B) contains an activated data-protection flag 708(B), which indicates that the I/O operation identified within I/O descriptor 702(B) is to be subject to a data-protection operation. In this example, data-protection agent 209 may then perform a data-protection operation on the I/O operation identified within I/O descriptor 702(B), as explained in greater detail below in connection with step 508 in exemplary method 500 in FIG. 5.

A file system may flag an I/O descriptor as being subject to a data-protection operation in a variety of ways. In one example, a file system may flag an I/O descriptor by activating a specific bit within the I/O descriptor that corresponds to a data-protection flag. In other embodiments, a file system may flag an I/O descriptor by sending an additional in-band communication with the I/O descriptor that indicates that the I/O operation identified within the I/O descriptor is to be subject to a data-protection operation.

In some examples, the systems described herein may perform data-protection operations on all I/O operations directed to metadata in order to maintain file-system consistency. For example, if file system 206 in FIG. 2 determines that an I/O request received from application 204 is directed file-system metadata, then file system 206 may, when creating an I/O descriptor for the I/O request, flag the I/O descriptor as file-system metadata (by, e.g., activating metadata flag 706(A) in FIG. 7). File system 206 may then send this flagged I/O descriptor to volume manager 208.

Figure 7:
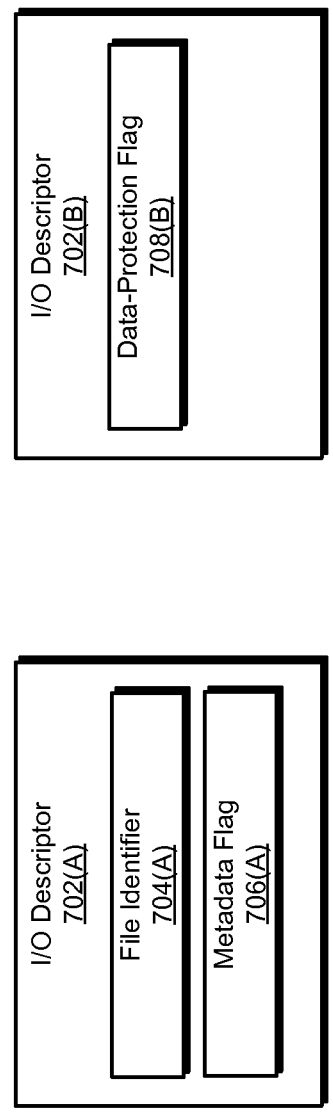
FIG. 7 is a block diagram of exemplary I/O descriptors containing unique file identifiers, metadata flags, and/or data-protection flags.

Upon receiving an I/O descriptor from file system 206, data-protection agent 209 within volume manager 208 may determine whether a metadata flag (such as metadata flag 706(A) in FIG. 7) within the I/O descriptor has been activated. If so, then data-protection agent 209 may perform a data-protection operation on the I/O operation identified within the I/O descriptor.

In another example, a module positioned at the volume-manager and/or storage-device level may maintain the data-protection list. In this example, a module positioned at the file-system level may: 1) identify and assign a unique file identifier (such as an inode number and/or file handle) to each I/O descriptor that it sends to an underlying volume manager and/or storage system (e.g., upon receiving a request from an application to perform an I/O operation on a file, the module positioned at the file-system level may, when generating an I/O descriptor for the requested I/O operation, include an inode number or other file descriptor for the file in question within the I/O descriptor) and/or 2) indicate whether the I/O operation identified within each I/O descriptor that it sends to an underlying volume manager and/or storage system is directed to file-system metadata (by, e.g., flagging the I/O descriptor as file-system metadata). Upon receiving an I/O descriptor from the file system, a module at the volume-manager level and/or storage-system level may determine whether: 1) the unique file identifier associated with the I/O descriptor is contained within the data-protection list and/or 2) the I/O descriptor has been flagged as file-system metadata. If so, then a data-protection agent at the volume-manager and/or storage-system level may perform a data-protection operation on the I/O operation identified within the I/O descriptor.

For example, upon receiving a request from application 304 to perform an I/O operation on a file stored on primary storage system 332, file system 306 may: 1) identify an inode number or file handle associated with the file in question and 2) determine that the file in question does not represent file-system metadata. In this example, file system 306 may then generate I/O descriptor 702(A) in FIG. 7 for the requested I/O operation that includes both: 1) a file identifier 704(A) that uniquely identifies the file to which the I/O operation is directed and 2) a deactivated metadata flag 706(A) that indicates that the I/O operation is not directed to file-system metadata.

In the above example, upon receiving I/O descriptor 702(A) from file system 306 in FIG. 3 in step 502, access module 106 and/or determination module 108 in FIG. 1 may, as part of data-protection agent 309 within volume manager 308 in FIG. 3, determine in steps 504 and 506 that the unique file identifier contained within I/O descriptor 702(A) (i.e., file identifier 704(A)) is identical to a unique file identifier contained within data-protection list 122.

Similarly, upon receiving an I/O descriptor from file system 406 in FIG. 4 in step 502, access module 106 and/or determination module 108 in FIG. 1 may, as part of data-protection agent 409 on primary storage system 432 in FIG. 4, determine in steps 504 and 506 whether: 1) the unique file identifier associated with the I/O descriptor is contained within data-protection list 122 and/or 2) the I/O descriptor has been flagged as file-system metadata. If so, then data-protection agent 409 may perform a data-protection operation on the I/O operation identified within the I/O descriptor, as explained in greater detail below in connection with step 508.

Returning to FIG. 5, at step 508 the systems described herein may, upon determining in step 506 that the I/O operation is directed to at least a portion of at least one file identified on the data-protection list accessed in step 504, perform a data-protection operation on the I/O operation. For example, data-protection module 110 in FIG. 1 may, as part of data-protection agent 209 within volume manager 208 in FIG. 2, perform a data-protection operation on an I/O operation identified within an I/O descriptor received from file system 206.

The systems described herein may perform step 508 in a variety of ways and in a variety of context. For example, data-protection module 110 may perform a data-protection operation on the I/O operation identified in step 502 by, for example, replicating the I/O operation to a secondary storage system, mirroring the I/O operation on a secondary store system, implementing the I/O operation within a snapshot stored on a secondary store system, implementing the I/O operation within a backup stored on a secondary store system, or the like.

For example, data-protection module 110 in FIG. 1 may, as part of data-protection agent 209 in FIG. 2, replicate an I/O operation identified within an I/O descriptor received from file system 206 to secondary storage system 252. Similarly, data-protection module 110 may, as part of data-protection agent 309 in FIG. 3, mirror an I/O operation identified within an I/O descriptor received from file system 306 to secondary storage system 352 (in order to, e.g., achieve continuous data protection).

In addition, data-protection module 110 in FIG. 1 may, as part of data-protection agent 409 on primary storage system 432 in FIG. 4, copy an I/O operation identified within an I/O descriptor received from file system 406 to a snapshot (such as a copy-on-right (space-optimized or non-space-optimized) or mirror-break-off snapshot) stored on secondary storage system 452. Similarly, data-protection module 110 may, as part of data-protection agent 409, copy an I/O operation identified within an I/O descriptor received from file system 406 to a backup (such as a full, incremental, or snapshot-based backup) stored on secondary storage system 452.

In some examples, the systems described herein may perform a data-protection operation on the I/O operation identified in step 502 in the order in which the I/O operation was received. For example, in the case of a replication operation, data-protection agent 209 in FIG. 2 may replicate select data or I/O operations from primary site 202 to secondary site 222 in the order in which the I/O operations are received.

In one example, a filter driver at the secondary storage system may filter out all requests to access files on the secondary storage system that are not identified on the data-protection list (by, e.g., only servicing I/O requests that are directed to files that are identified within the data-protection list) in order to maintain file-system consistency. For example, secondary site 222 in FIG. 2 may contain a filter driver 225. In this example, filter driver 225 may only service I/O requests that are directed to files located on secondary storage system 252 that are identified within data-protection list 122. For example, if filter driver 225 receives an I/O request from application 224 directed to a file, then filter driver 225 may determine whether the file in question is identified within data-protection list 122. If so, then filter driver 225 may service the I/O request. However, if filter driver 225 determines that the file in question is not identified within data-protection list 122, then filter driver 225 may ignore the I/O request.

As detailed above, by maintaining a data-protection list that uniquely identifies user- or machine-specified files that are to be protected by a data-protection operation, the systems and methods described herein may enable users to selectively protect files (or I/O operations directed to such files) using traditional block-level technologies. As such, these systems and methods may enable users to protect data at the file level while maintaining the performance advantages offered by data-level technologies.

Figure 8:
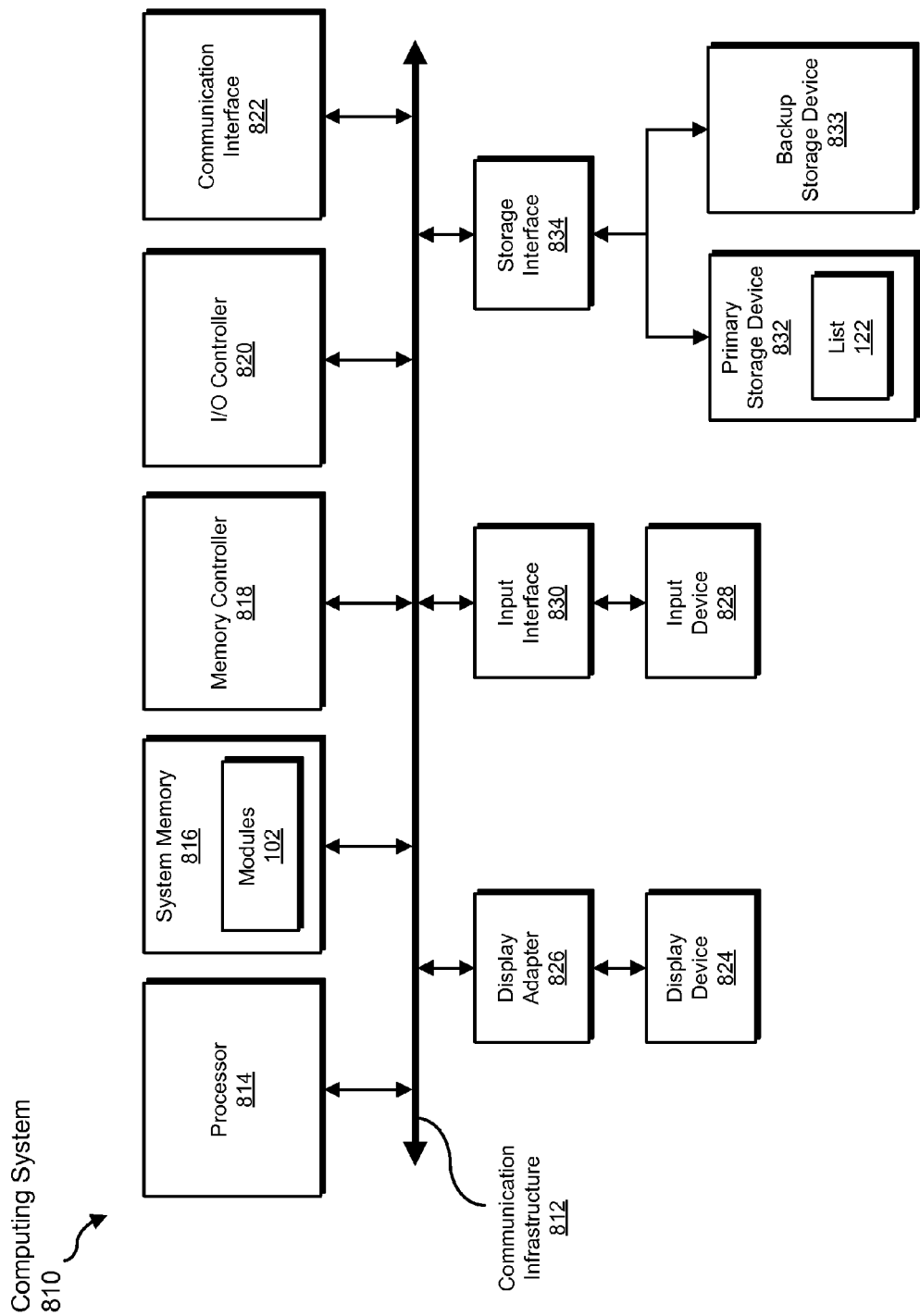
FIG. 8 is a block diagram of an exemplary computing system capable of implementing one or more of the embodiments described and/or illustrated herein.

FIG. 8 is a block diagram of an exemplary computing system 810 capable of implementing one or more of the embodiments described and/or illustrated herein. Computing system 810 broadly represents any single or multi-processor computing device or system capable of executing computer-readable instructions. Examples of computing system 810 include, without limitation, workstations, laptops, client-side terminals, servers, distributed computing systems, handheld devices, or any other computing system or device. In its most basic configuration, computing system 810 may include at least one processor 814 and a system memory 816.

Processor 814 generally represents any type or form of processing unit capable of processing data or interpreting and executing instructions. In certain embodiments, processor 814 may receive instructions from a software application or module. These instructions may cause processor 814 to perform the functions of one or more of the exemplary embodiments described and/or illustrated herein. For example, processor 814 may perform and/or be a means for performing, either alone or in combination with other elements, one or more of the identifying, accessing, determining, performing, retrieving, replicating, mirroring, implementing, and providing steps described herein. Processor 814 may also perform and/or be a means for performing any other steps, methods, or processes described and/or illustrated herein.

System memory 816 generally represents any type or form of volatile or non-volatile storage device or medium capable of storing data and/or other computer-readable instructions. Examples of system memory 816 include, without limitation, random access memory (RAM), read only memory (ROM), flash memory, or any other suitable memory device. Although not required, in certain embodiments computing system 810 may include both a volatile memory unit (such as, for example, system memory 816) and a non-volatile storage device (such as, for example, primary storage device 832, as described in detail below). In one example, one or more of modules 102 from FIG. 1 may be loaded into system memory 816.

In certain embodiments, exemplary computing system 810 may also include one or more components or elements in addition to processor 814 and system memory 816. For example, as illustrated in FIG. 8, computing system 810 may include a memory controller 818, an Input/Output (I/O) controller 820, and a communication interface 822, each of which may be interconnected via a communication infrastructure 812. Communication infrastructure 812 generally represents any type or form of infrastructure capable of facilitating communication between one or more components of a computing device. Examples of communication infrastructure 812 include, without limitation, a communication bus (such as an ISA, PCI, PCIe, or similar bus) and a network.

Memory controller 818 generally represents any type or form of device capable of handling memory or data or controlling communication between one or more components of computing system 810. For example, in certain embodiments memory controller 818 may control communication between processor 814, system memory 816, and I/O controller 820 via communication infrastructure 812. In certain embodiments, memory controller 818 may perform and/or be a means for performing, either alone or in combination with other elements, one or more of the steps or features described and/or illustrated herein, such as identifying, accessing, determining, performing, retrieving, replicating, mirroring, implementing, and providing.

I/O controller 820 generally represents any type or form of module capable of coordinating and/or controlling the input and output functions of a computing device. For example, in certain embodiments I/O controller 820 may control or facilitate transfer of data between one or more elements of computing system 810, such as processor 814, system memory 816, communication interface 822, display adapter 826, input interface 830, and storage interface 834. I/O controller 820 may be used, for example, to perform and/or be a means for performing, either alone or in combination with other elements, one or more of the identifying, accessing, determining, performing, retrieving, replicating, mirroring, implementing, and providing steps described herein. I/O controller 820 may also be used to perform and/or be a means for performing other steps and features set forth in the instant disclosure.

Communication interface 822 broadly represents any type or form of communication device or adapter capable of facilitating communication between exemplary computing system 810 and one or more additional devices. For example, in certain embodiments communication interface 822 may facilitate communication between computing system 810 and a private or public network including additional computing systems. Examples of communication interface 822 include, without limitation, a wired network interface (such as a network interface card), a wireless network interface (such as a wireless network interface card), a modem, and any other suitable interface. In at least one embodiment, communication interface 822 may provide a direct connection to a remote server via a direct link to a network, such as the Internet. Communication interface 822 may also indirectly provide such a connection through, for example, a local area network (such as an Ethernet network), a personal area network, a telephone or cable network, a cellular telephone connection, a satellite data connection, or any other suitable connection.

In certain embodiments, communication interface 822 may also represent a host adapter configured to facilitate communication between computing system 810 and one or more additional network or storage devices via an external bus or communications channel. Examples of host adapters include, without limitation, SCSI host adapters, USB host adapters, IEEE 1394 host adapters, SATA and eSATA host adapters, ATA and PATA host adapters, Fibre Channel interface adapters, Ethernet adapters, or the like. Communication interface 822 may also allow computing system 810 to engage in distributed or remote computing. For example, communication interface 822 may receive instructions from a remote device or send instructions to a remote device for execution. In certain embodiments, communication interface 822 may perform and/or be a means for performing, either alone or in combination with other elements, one or more of the identifying, accessing, determining, performing, retrieving, replicating, mirroring, implementing, and providing steps disclosed herein. Communication interface 822 may also be used to perform and/or be a means for performing other steps and features set forth in the instant disclosure.

As illustrated in FIG. 8, computing system 810 may also include at least one display device 824 coupled to communication infrastructure 812 via a display adapter 826. Display device 824 generally represents any type or form of device capable of visually displaying information forwarded by display adapter 826. Similarly, display adapter 826 generally represents any type or form of device configured to forward graphics, text, and other data from communication infrastructure 812 (or from a frame buffer, as known in the art) for display on display device 824.

As illustrated in FIG. 8, exemplary computing system 810 may also include at least one input device 828 coupled to communication infrastructure 812 via an input interface 830. Input device 828 generally represents any type or form of input device capable of providing input, either computer or human generated, to exemplary computing system 810. Examples of input device 828 include, without limitation, a keyboard, a pointing device, a speech recognition device, or any other input device. In at least one embodiment, input device 828 may perform and/or be a means for performing, either alone or in combination with other elements, one or more of the identifying, accessing, determining, performing, retrieving, replicating, mirroring, implementing, and providing steps disclosed herein. Input device 828 may also be used to perform and/or be a means for performing other steps and features set forth in the instant disclosure.

As illustrated in FIG. 8, exemplary computing system 810 may also include a primary storage device 832 and a backup storage device 833 coupled to communication infrastructure 812 via a storage interface 834. Storage devices 832 and 833 generally represent any type or form of storage device or medium capable of storing data and/or other computer-readable instructions. For example, storage devices 832 and 833 may be a magnetic disk drive (e.g., a so-called hard drive), a floppy disk drive, a magnetic tape drive, an optical disk drive, a flash drive, or the like. Storage interface 834 generally represents any type or form of interface or device for transferring data between storage devices 832 and 833 and other components of computing system 810. In one example, data-protection list 122 from FIG. 1 may be stored in primary storage device 832.

In certain embodiments, storage devices 832 and 833 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 832 and 833 may also include other similar structures or devices for allowing computer software, data, or other computer-readable instructions to be loaded into computing system 810. For example, storage devices 832 and 833 may be configured to read and write software, data, or other computer-readable information. Storage devices 832 and 833 may also be a part of computing system 810 or may be a separate device accessed through other interface systems.

In certain embodiments, storage devices 832 and 833 may be used, for example, to perform and/or be a means for performing, either alone or in combination with other elements, one or more of the identifying, accessing, determining, performing, retrieving, replicating, mirroring, implementing, and providing steps disclosed herein. Storage devices 832 and 833 may also be used to perform and/or be a means for performing other steps and features set forth in the instant disclosure.

Many other devices or subsystems may be connected to computing system 810. Conversely, all of the components and devices illustrated in FIG. 8 need not be present to practice the embodiments described and/or illustrated herein. The devices and subsystems referenced above may also be interconnected in different ways from that shown in FIG. 8. Computing system 810 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The phrase "computer-readable medium" generally refers to any form of device, carrier, or medium capable of storing or carrying computer-readable instructions. Examples of computer-readable media include, without limitation, transmission-type media, such as carrier waves, and physical media, such as magnetic-storage media (e.g., hard disk drives and floppy disks), optical-storage media (e.g., CD- or DVD-ROMs), electronic-storage media (e.g., solid-state drives and flash media), and other distribution systems.

The computer-readable medium containing the computer program may be loaded into computing system 810. All or a portion of the computer program stored on the computer-readable medium may then be stored in system memory 816 and/or various portions of storage devices 832 and 833. When executed by processor 814, a computer program loaded into computing system 810 may cause processor 814 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 810 may be configured as an application specific integrated circuit (ASIC) adapted to implement one or more of the exemplary embodiments disclosed herein.

Figure 9:
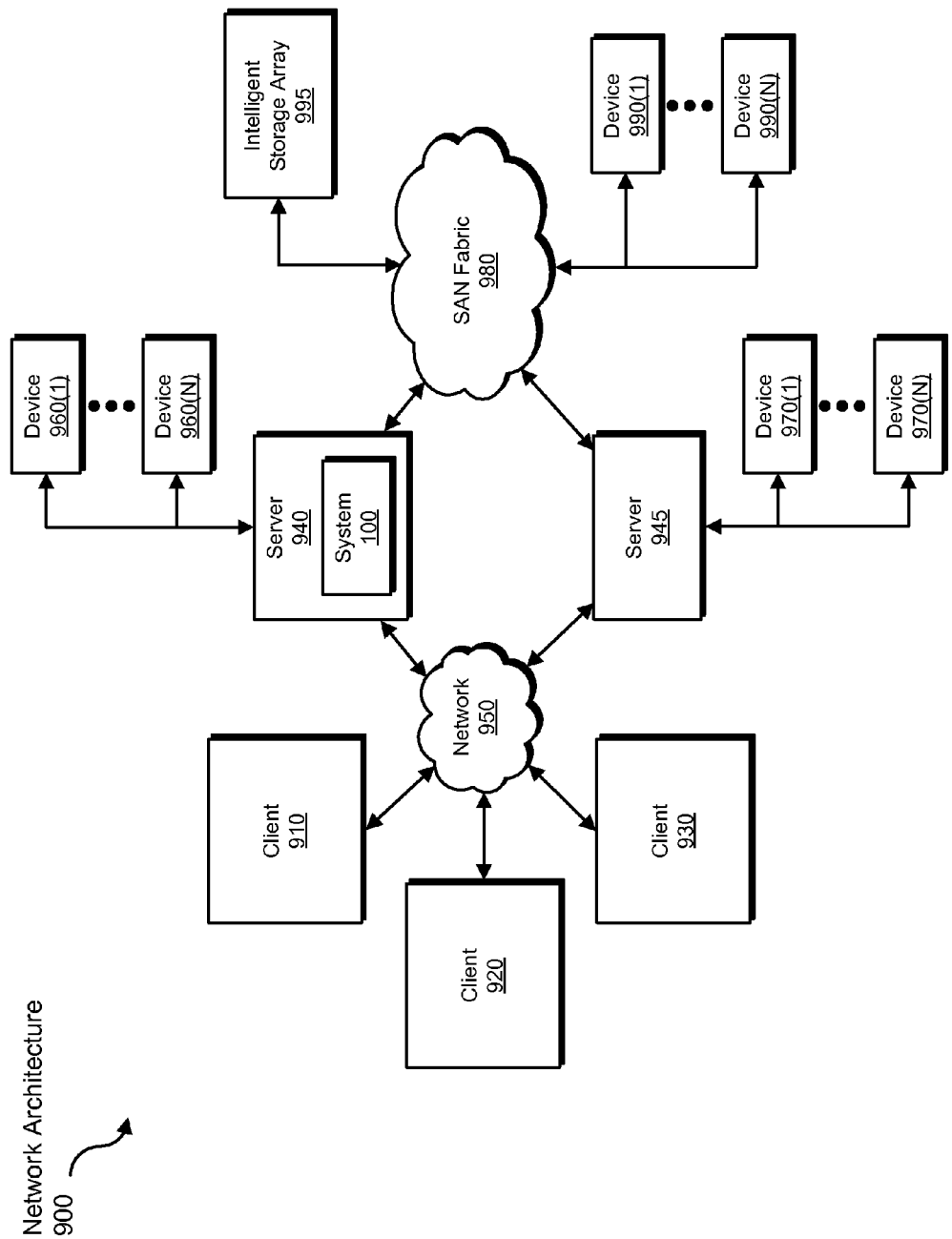
FIG. 9 is a block diagram of an exemplary computing network capable of implementing one or more of the embodiments described and/or illustrated herein.

FIG. 9 is a block diagram of an exemplary network architecture 900 in which client systems 910, 920, and 930 and servers 940 and 945 may be coupled to a network 950. Client systems 910, 920, and 930 generally represent any type or form of computing device or system, such as exemplary computing system 810 in FIG. 8.

Similarly, servers 940 and 945 generally represent computing devices or systems, such as application servers or database servers, configured to provide various database services and/or run certain software applications. Network 950 generally represents any telecommunication or computer network including, for example, an intranet, a wide area network (WAN), a local area network (LAN), a personal area network (PAN), or the Internet. In one example, client systems 910, 920, and/or 930 and/or servers 940 and/or 945 may include system 100 from FIG. 1.

As illustrated in FIG. 9, one or more storage devices 960(1)-(N) may be directly attached to server 940. Similarly, one or more storage devices 970(1)-(N) may be directly attached to server 945. Storage devices 960(1)-(N) and storage devices 970(1)-(N) generally represent any type or form of storage device or medium capable of storing data and/or other computer-readable instructions. In certain embodiments, storage devices 960(1)-(N) and storage devices 970(1)-(N) may represent network-attached storage (NAS) devices configured to communicate with servers 940 and 945 using various protocols, such as NFS, SMB, or CIFS.

Servers 940 and 945 may also be connected to a storage area network (SAN) fabric 980. SAN fabric 980 generally represents any type or form of computer network or architecture capable of facilitating communication between a plurality of storage devices. SAN fabric 980 may facilitate communication between servers 940 and 945 and a plurality of storage devices 990(1)-(N) and/or an intelligent storage array 995. SAN fabric 980 may also facilitate, via network 950 and servers 940 and 945, communication between client systems 910, 920, and 930 and storage devices 990(1)-(N) and/or intelligent storage array 995 in such a manner that devices 990(1)-(N) and array 995 appear as locally attached devices to client systems 910, 920, and 930. As with storage devices 960(1)-(N) and storage devices 970(1)-(N), storage devices 990(1)-(N) and intelligent storage array 995 generally represent any type or form of storage device or medium capable of storing data and/or other computer-readable instructions.

In certain embodiments, and with reference to exemplary computing system 810 of FIG. 8, a communication interface, such as communication interface 822 in FIG. 8, may be used to provide connectivity between each client system 910, 920, and 930 and network 950. Client systems 910, 920, and 930 may be able to access information on server 940 or 945 using, for example, a web browser or other client software. Such software may allow client systems 910, 920, and 930 to access data hosted by server 940, server 945, storage devices 960(1)-(N), storage devices 970(1)-(N), storage devices 990(1)-(N), or intelligent storage array 995. Although FIG. 9 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 940, server 945, storage devices 960(1)-(N), storage devices 970(1)-(N), storage devices 990(1)-(N), intelligent storage array 995, or any combination thereof. All or a portion of one or more of the exemplary embodiments disclosed herein may also be encoded as a computer program, stored in server 940, run by server 945, and distributed to client systems 910, 920, and 930 over network 950. Accordingly, network architecture 900 may perform and/or be a means for performing, either alone or in combination with other elements, one or more of the identifying, accessing, determining, performing, retrieving, replicating, mirroring, implementing, and providing steps disclosed herein. Network architecture 900 may also be used to perform and/or be a means for performing other steps and features set forth in the instant disclosure.

As detailed above, computing system 810 and/or one or more components of network architecture 900 may perform and/or be a means for performing, either alone or in combination with other elements, one or more steps of an exemplary method for achieving file-level data-protection operations using block-level technologies. In one example, such a method may include: 1) identifying an I/O operation directed to at least one data block on a primary storage system, 2) accessing a data-protection list that uniquely identifies files that are to be protected by a data-protection operation, 3) determining that the I/O operation is directed to at least a portion of at least one file identified on the data-protection list, and then, in response to the determination, 4) performing the data-protection operation on the I/O operation.

In some examples, identifying the I/O operation may include identifying a unique file identifier associated with the I/O operation. The unique file identifier may represent an inode number and/or a file descriptor. In these examples, determining that the I/O operation is directed to at least a portion of at least one file identified on the data-protection list may include determining that the unique file identifier is contained within the data-protection list.

In one embodiment, accessing the data-protection list may include retrieving the data-protection list via a file system, via a volume manager, or directly from a primary storage system. In some examples, the data-protection list may uniquely identify user-specified and/or machine-specified files that are to be protected by the data-protection operation. The data-protection list may uniquely identify files that are to be protected by the data-protection operation by uniquely identifying files that are to be included and/or excluded when performing the data-protection operation.

In some examples, determining that the I/O operation is directed to at least a portion of at least one file identified on the data-protection list may include determining that the I/O operation has been flagged as being subject to the data-protection operation. In addition, performing the data-protection operation on the I/O operation may include replicating the I/O operation to a secondary storage system, mirroring the I/O operation on a secondary storage system, implementing the I/O operation within a snapshot stored on a secondary storage system, and/or implementing the I/O operation within a backup stored on a secondary storage system.

In one example, performing the data-protection operation on the I/O operation may include providing a filter driver at the secondary storage system that filters out all requests to access files on the secondary storage system that are not identified on the data-protection list. Performing the data-protection operation on the I/O operation may also include performing the data-protection operation on the I/O operation in the order in which the I/O operation was received.

In some examples, the method may also include: 1) identifying an additional I/O operation directed to at least one additional data block on the primary storage system, 2) determining that the additional I/O operation has been flagged as file-system metadata, and then, in response to the determination, 3) performing the data-protection operation on the additional I/O operation.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, modules 102 from FIG. 1 may transform a property or characteristic of a secondary site (such as secondary site 222 in FIG. 2) by storing protected data on the same.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

What is claimed is:

1. A computer-implemented method for achieving file-level data-protection operations using block-level technologies, at least a portion of the method being performed by a computing device comprising at least one processor, the method comprising:
    identifying a plurality of input/output ("I/O") operations, each of which is directed to at least one data block on a primary storage system;
    accessing a data-protection list that uniquely identifies a select subset of files on the primary storage system that are to be protected by a block-level data-protection operation that copies data on a block-by-block basis from the primary storage system to a secondary storage system;
    determining, by analyzing the data-protection list, that:
        at least one I/O operation within the plurality of I/O operations is directed to at least a portion of at least one of the files within the select subset of files identified on the data-protection list;
        at least one additional I/O operation within the plurality of I/O operations is directed to a file that is not included within the select subset of files identified on the data-protection list;
    achieving file-level data-protection operations on the select subset of files identified on the data-protection list using block-level data-protection operations by, in response to the determination:
        performing the block-level data-protection operation on the I/O operation that is directed to the file within the select subset of files identified on the data-protection list;
        excluding, from the block-level data-protection operation, the additional I/O operation that is directed to the file that is not included within the select subset of files identified on the data-protection list;
    maintaining file-system consistency between the primary storage system and the secondary storage system by providing a filter driver at the secondary storage system that:
        maintains a local copy of the data-protection list;
        filters out all requests to access files on the secondary storage system that are not identified on the local copy of the data-protection list by only servicing requests to access files on the secondary storage system that are identified within the local copy of the data-protection list.

2. The method of claim 1, further comprising identifying a unique file identifier associated with the I/O operation.

3. The method of claim 2, wherein the unique file identifier comprises at least one of:
    an inode number;
    a file descriptor.

4. The method of claim 2, wherein determining that the I/O operation is directed to the file within the select subset of files identified on the data-protection list comprises determining that the unique file identifier is contained within the data-protection list.

5. The method of claim 1, wherein accessing the data-protection list comprises at least one of:
    retrieving the data-protection list via a file system;
    retrieving the data-protection list via a volume manager;
    retrieving the data-protection list directly from the primary storage system.

6. The method of claim 1, wherein the data-protection list uniquely identifies at least one of:
    a select subset of user-specified files on the primary storage system that are to be protected by the block-level data-protection operation;
    a select subset of machine-specified files on the primary storage system that are to be protected by the block-level data-protection operation.

7. The method of claim 1, wherein the data-protection list uniquely identifies the select subset of files on the primary storage system that are to be protected by the block-level data-protection operation by at least one of:
    uniquely identifying files that are to be included when performing the block-level data-protection operation;
    uniquely identifying files that are to be excluded when performing the block-level data-protection operation.

8. The method of claim 1, wherein determining that the I/O operation is directed to the file within the select subset of files identified on the data-protection list comprises determining that the I/O operation has been flagged as being subject to the block-level data-protection operation.

9. The method of claim 1, wherein performing the block-level data-protection operation on the I/O operation comprises at least one of:
    replicating the I/O operation block-by-block to the secondary storage system;

mirroring the I/O operation block-by-block on the secondary storage system;
implementing the I/O operation block-by-block within a snapshot stored on the secondary storage system;
implementing the I/O operation block-by-block within a backup stored on the secondary storage system.

10. The method of claim 1, wherein performing the block-level data-protection operation on the I/O operation comprises performing the block-level data-protection operation on the I/O operation in the order in which the I/O operation was received.

11. The method of claim 1, further comprising:
identifying at least one other I/O operation that is directed to at least one data block on the primary storage system;
determining that the other I/O operation has been flagged as file-system metadata;
in response to the determination, performing the block-level data-protection operation on the other I/O operation.

12. A non-transitory computer-readable-storage medium comprising computer-executable instructions that, when executed by at least one processor of a computing device, cause the computing device to:
identify a plurality of input/output ("I/O") operations, each of which is directed to at least one data block on a primary storage system;
access a data-protection list that uniquely identifies a select subset of files on the primary storage system that are to be protected by a block-level data-protection operation that copies data on a block-by-block basis from the primary storage system to a secondary storage system;
determine, by analyzing the data-protection list, that:
at least one I/O operation within the plurality of I/O operations is directed to at least a portion of at least one of the files within the select subset of files identified on the data-protection list;
at least one additional I/O operation within the plurality of I/O operations is directed to a file that is not included within the select subset of files identified on the data-protection list;
achieve file-level data-protection operations on the select subset of files identified on the data-protection list using block-level data-protection operations by, in response to the determination:
performing the block-level data-protection operation on the I/O operation that is directed to the file within the select subset of files identified on the data-protection list;
excluding, from the block-level data-protection operation, the additional I/O operation that is directed to the file that is not included within the select subset of files identified on the data-protection list;
maintain file-system consistency between the primary storage system and the secondary storage system by providing a filter driver at the secondary storage system that:
maintains a local copy of the data-protection list;
filters out all requests to access files on the secondary storage system that are not identified on the local copy of the data-protection list by only servicing requests to access files on the secondary storage system that are identified within the local copy of the data-protection list.

13. A system for achieving file-level data-protection operations using block-level technologies, the system comprising:
an identification module programmed to identify a plurality of input/output ("I/O") operations, each of which is directed to at least one data block on a primary storage system;
an access module programmed to access a data-protection list that uniquely identifies a select subset of files on the primary storage system that are to be protected by a block-level data-protection operation that copies data on a block-by-block basis from the primary storage system to a secondary storage system;
a determination module programmed to determine, by analyzing the data-protection list, that:
at least one I/O operation within the plurality of I/O operations is directed to at least a portion of at least one of the files within the select subset of files identified on the data-protection list;
at least one additional I/O operation within the plurality of I/O operations is directed to a file that is not included within the select subset of files identified on the data-protection list;
a data-protection module programmed to achieve file-level data-protection operations on the select subset of files identified on the data-protection list using block-level data-protection operations by, in response to the determination:
performing the block-level data-protection operation on the I/O operation that is directed to the file within the select subset of files identified on the data-protection list;
excluding, from the block-level data-protection operation, the additional I/O operation that is directed to the file that is not included within the select subset of files identified on the data-protection list;
a filter module programmed to maintain file-system consistency between the primary storage system and the secondary storage system by providing a filter driver at the secondary storage system that:
maintains a local copy of the data-protection list;
filters out all requests to access files on the secondary storage system that are not identified on the local copy of the data-protection list by only servicing requests to access files on the secondary storage system that are identified within the local copy of the data-protection list;
at least one processor configured to execute the identification module, the access module, the determination module, the data-protection module, and the filter module.

14. The system of claim 13, wherein the access module accesses the data-protection list by at least one of:
retrieving the data-protection list via a file system;
retrieving the data-protection list via a volume manager;
retrieving the data-protection list directly from the primary storage system.

15. The system of claim 13, wherein the data-protection list uniquely identifies the select subset of files on the primary storage system that are to be protected by the block-level data-protection operation by at least one of:
uniquely identifying files that are to be included when performing the block-level data-protection operation;
uniquely identifying files that are to be excluded when performing the block-level data-protection operation.

16. The system of claim 13, wherein the determination module determines that the I/O operation is directed to the file within the select subset of files identified on the data-protection list by determining that the I/O operation has been flagged as being subject to the block-level data-protection operation.

17. The system of claim 13, wherein the data-protection module performs the block-level data-protection operation on the I/O operation by at least one of:
- replicating the I/O operation block-by-block to the secondary storage system;
- mirroring the I/O operation block-by-block on the secondary storage system;
- implementing the I/O operation block-by-block within a snapshot stored on the secondary storage system;
- implementing the I/O operation block-by-block within a backup stored on the secondary storage system.

18. The system of claim 13, wherein:
- the identification module is further programmed to identify at least one other I/O operation directed to at least one data block on the primary storage system;
- the determination module is further programmed to determine that the other I/O operation has been flagged as file-system metadata;
- the data-protection module is further programmed to perform, in response to the determination, the block-level data-protection operation on the other I/O operation.

* * * * *